(12) United States Patent
Martin et al.

(10) Patent No.: US 9,917,957 B1
(45) Date of Patent: Mar. 13, 2018

(54) CROPPING IMAGE WITHIN IMAGE PREVIEW

(71) Applicant: Xerox Corporation, Norwalk, CT (US)

(72) Inventors: Andrew T. Martin, Honeoye Falls, NY (US); Brandon S. McComber, Webster, NY (US); Ken Hayward, Brockport, NY (US); Shane Jewitt, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/354,485

(22) Filed: Nov. 17, 2016

(51) Int. Cl.
*H04N 1/00* (2006.01)
*H04N 1/387* (2006.01)
(Continued)

(52) U.S. Cl.
CPC ....... *H04N 1/00167* (2013.01); *G06F 3/1208* (2013.01); *G06F 3/1256* (2013.01); *H04N 1/0044* (2013.01); *H04N 1/00161* (2013.01); *H04N 1/00188* (2013.01); *H04N 1/00411* (2013.01); *H04N 1/00413* (2013.01); *H04N 1/00416* (2013.01); *H04N 1/00456* (2013.01); *H04N 1/00469* (2013.01); *H04N 1/00474* (2013.01); *H04N 1/00485* (2013.01); *H04N 1/387* (2013.01); *H04N 1/3872* (2013.01);
(Continued)

(58) Field of Classification Search
CPC ........... H04N 1/00161; H04N 1/00164; H04N 1/00167; H04N 1/00183; H04N 1/00185; H04N 1/00188; H04N 1/00196; H04N 1/00198; H04N 1/00405; H04N 1/00408; H04N 1/00411; H04N 1/00413; H04N 1/00416; H04N 1/0044; H04N 1/00442; H04N 1/00456; H04N 1/00469; H04N 1/00474; H04N 1/00482; H04N 1/00485; H04N 1/387–1/3935; G06F 3/1203; G06F 3/1205; G06F 3/1206; G06F 3/1208; G06F 3/1237; G06F 3/1242; G06F 3/1243; G06F 3/125; G06F 3/1252; G06F 3/1253; G06F 3/1256; G06K 15/1868; G06K 15/1871; G06K 15/1882; G06K 15/1885; G06K 15/1894
See application file for complete search history.

(56) References Cited

U.S. PATENT DOCUMENTS 6,519,046 B1 * 2/2003 Kinjo ................... G03D 15/001
348/207.1
6,906,746 B2 * 6/2005 Hijishiri ............... H04N 1/0044
348/240.2
(Continued)

*Primary Examiner* — Scott A Rogers
(74) *Attorney, Agent, or Firm* — Gibb & Riley, LLC

(57) ABSTRACT

A cropping electronic display image is provided in response to selection of an image crop menu option. The cropping electronic display image includes a geometric shape superimposed on the input image. Operation of the user input component changing position of at least one side of the geometric shape within the cropping electronic display image is detected to identify a selected cropped image area. Portions of the input image outside the selected cropped image area are removed to produce a cropped image, in response to completing the process of changing position of at least one side of the geometric shape. The cropped image and the cropped image area are enlarged to fit within the cropping electronic display image.

20 Claims, 18 Drawing Sheets

(51) Int. Cl.
*H04N 1/393* (2006.01)
*G06F 3/12* (2006.01)

(52) U.S. Cl.
CPC ........... *H04N 1/3875* (2013.01); *H04N 1/393* (2013.01); *H04N 1/00442* (2013.01); *H04N 1/3877* (2013.01)

(56) References Cited

U.S. PATENT DOCUMENTS

| | | | |
|---|---|---|---|
| 7,171,058 B2* | 1/2007 | Luo | H04N 1/3875 358/453 |
| 7,561,793 B2 | 7/2009 | Brost | |
| 7,945,116 B2 | 5/2011 | Curtis | |
| 7,978,918 B2 | 7/2011 | Scalise et al. | |
| 8,542,198 B2 | 9/2013 | Kumor | |
| 8,798,335 B1 | 8/2014 | Agopian et al. | |
| 8,972,879 B2 | 3/2015 | Migos et al. | |
| 9,158,455 B2 | 10/2015 | Bhatt et al. | |
| 9,279,983 B1 | 3/2016 | Davis | |
| 2013/0016122 A1 | 1/2013 | Bhatt et al. | |
| 2013/0321313 A1 | 12/2013 | Huang et al. | |

* cited by examiner

CROPPING IMAGE WITHIN IMAGE PREVIEW

BACKGROUND

Systems and methods herein generally relate to cropping images using an electronic display.

Image cropping has received limited support on digital multifunction devices, and when supported is usually cumbersome, ranging from blindly guessing at x/y coordinates, to mimic based coordinate entry, to nebulous on screen area designation based on a fixed preview image, etc. Additionally, the effects of positioning and enlargement settings on the final output are sometimes unclear. All of this results in users attempting to obtain the desired output through trial and error, or abandoning the capability all together.

SUMMARY

Various methods herein receive, into a processor, an input image. The input image can be an input image, a printable document generated by an application, a printable item retrieved from storage, etc. These methods also provide, from the processor to a display device, an image crop menu option (e.g., within a multi-function device interface). The display device includes a user input component interacting with screens displayed on the display device. In response to selection of the image crop menu option (through the user input component) these methods provide, from the processor to the display device, a cropping electronic display image. The cropping electronic display image includes a geometric shape (e.g., rectangle, a triangle, a circle, etc.) superimposed on the input image, an accept menu option, a cancel menu option, etc.

With the geometric shape superimposed on the input image in the cropping electronic display image, these methods detect operation of the user input component changing position of at least one side of the geometric shape within the cropping electronic display to identify a selected cropped image size. Further, such methods can detect additional operation of the user input component changing location of the geometric shape within the cropping electronic display image, and this allows the methods to identify a "selected" cropped image area. For example, the selected cropped image area of the input image can be displayed relatively brighter than the portions of the input image outside the selected cropped image area on the display device. Once the cropped image area has been selected, these methods detect further operation of the user input component completing the process of changing location of the geometric shape (e.g., by releasing the user interface screen or button) or, for example, selecting the accept menu option, and this indicates final acceptance of the selected cropped image area.

After the final acceptance of the selected cropped image area, these methods remove portions of the input image that are outside the selected cropped image area, and this produces a cropped image (and this is performed automatically in response to the accept menu being selected, using the processor). Next, the processor automatically enlarges the cropped image and cropped image area to best fit within the cropping electronic display image, using the processor to allow the cropped image to be most easily viewed on the display device. For example, to best fit the cropped image and cropped image area within the cropping electronic display image, the cropped image and cropped image area can be increased to occupy a percentage (e.g., 60%, 75%, 90%, etc.) of the center of the cropping electronic display image.

Once the cropped image is enlarged, these methods also detect a pinching movement through the user input component. In response to this pinching movement, the processor increases or decreases magnification of the cropped image, without changing the size of the cropped image area within the cropping electronic display image.

Additional, these methods can position the cropped image on different locations of an electronic printable page to produce different cropped image print examples, using the processor. The different locations of the electronic printable page can include, for example, the selected cropped image size centered on the electronic printable page, the cropped image expanded larger than the selected cropped image size to reach at least two sides of the electronic printable page, the cropped image having the selected cropped image size on the electronic printable page in a position corresponding to the selected cropped image area, etc.

Thus, the processor provides, to the display device, the different cropped image print examples. Further, these methods detect operation of the user input component selecting one of the different cropped image print examples to identify a selected cropped image print. A print menu option is displayed on the display device, and the selected cropped image is printed in response to selection of the print menu option.

Exemplary systems herein include (among other components) a processor; and a scanner, display device, printer, etc., operatively connected to (meaning directly or indirectly connected to) the processor, etc. The display device includes one or more user input components interacting with screens displayed on the display device.

The processor receives an input image from any location, such as from a scanner that scans an item, an application that generates a printable item, printable items previously stored in memory, etc. The processor provides, to the display device, any form of image crop menu option. In response to selection of the input image crop menu option through the user input component, the processor provides, to the display device, a cropping electronic display image. The cropping electronic display image includes, for example, a geometric shape (e.g., rectangle, triangle, circle, etc.) superimposed on the input image, an accept menu option, a cancel menu option, etc.

The display device displays the cropping electronic display image, and the user input component detects user input changing the position of at least one side of the geometric shape within the cropping electronic display image to identify a selected cropped image size. The user input component also detects user input changing the location of the geometric shape (having the selected cropped image size) within the cropping electronic display image, to identify a selected cropped image area. The user input component detects the user completing the process of changing location of the geometric shape (e.g., by releasing the user interface screen or button) or, for example, selecting the accept menu option, to indicate final acceptance of the selected cropped image area. For example, the display device can display the selected cropped image area of the input image relatively brighter than the portions of the input image outside the selected cropped image area.

In response to final acceptance of the selected cropped image area, the processor automatically removes portions of the input image that are outside the selected cropped image area to produce a cropped image. The processor enlarges the cropped image to best fit within the cropping electronic display image. Once the cropped image is enlarged, these methods can also detect a pinching movement through the user input component. In response to this pinching movement, the processor increases or decreases magnification of the cropped image, without changing the size of the cropped image area within the cropping electronic display image.

Additional, the processor can position the cropped image on different locations of an electronic printable page to produce different cropped image print examples, the processor provides the same to the display device, which are in turn displayed by the display device. The different locations of the electronic printable page can include, for example, the selected cropped image size centered on the electronic printable page, the cropped image expanded larger than the selected cropped image size to reach at least two sides of the electronic printable page, the cropped image having the selected cropped image size on the electronic printable page in a position corresponding to the selected cropped image area, etc. The user input component detects the user selecting one of the different cropped image print examples, and this identifies a selected cropped image print. Then, the display device displays a print menu option, and the printer prints the selected cropped image print in response to selection of the print menu option.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, image cropping can be cumbersome, and the effects of positioning and enlargement settings on the final output are sometimes unclear. Therefore, the systems and methods herein provide methods for easily and clearly defining the area to be cropped, and defining the final output after the image has been cropped. Systems and methods herein utilize preview of the actual image, allow the user to define and position the crop area through direct manipulation of the crop area itself as well as the underlying page, and allow the user to easily define the resulting image after the crop is made, by providing simple option selections. This can all be done using a capacitive touch screen located on a multifunction device.

More specifically, the systems and methods herein can use, for example, a capacitive touch screen located on a multifunction device control panel. The processing starts by scanning an original document and opening it in a preview mode. Using the image preview, the user selects the page from an image film strip with the content to be cropped and selects a crop option. The single page opens in an enlarged view with the crop area encompassing the full page, and such is indicated by control points on the corners and edges. The user can then size the crop area by dragging the control points, and position the crop area by dragging it to the desired location. Once the crop area is resized the view will automatically be enlarged (crop area and background image) to best fit in the viewing area to give the user a clear view of the cropped content. The user may also change the size of the background image by pinching and spreading their fingers on the screen, effectively changing the content to be cropped. The image outside of the crop area is grayed out to clearly indicate the content that will be removed (and that which will remain) after the crop.

Once the user is happy with the cropped image they can select a confirm option. They are then presented with selections to define how the final image should appear on the page. This includes Crop Only, Crop and Auto Center, Best Fit, Center and Fit, etc. These options are presented in the form of the actual cropped image positioned and sized on the page, relative to the respective option. The user selects the option that represents their desired outcome and the operation is then complete.

Figure 1A:
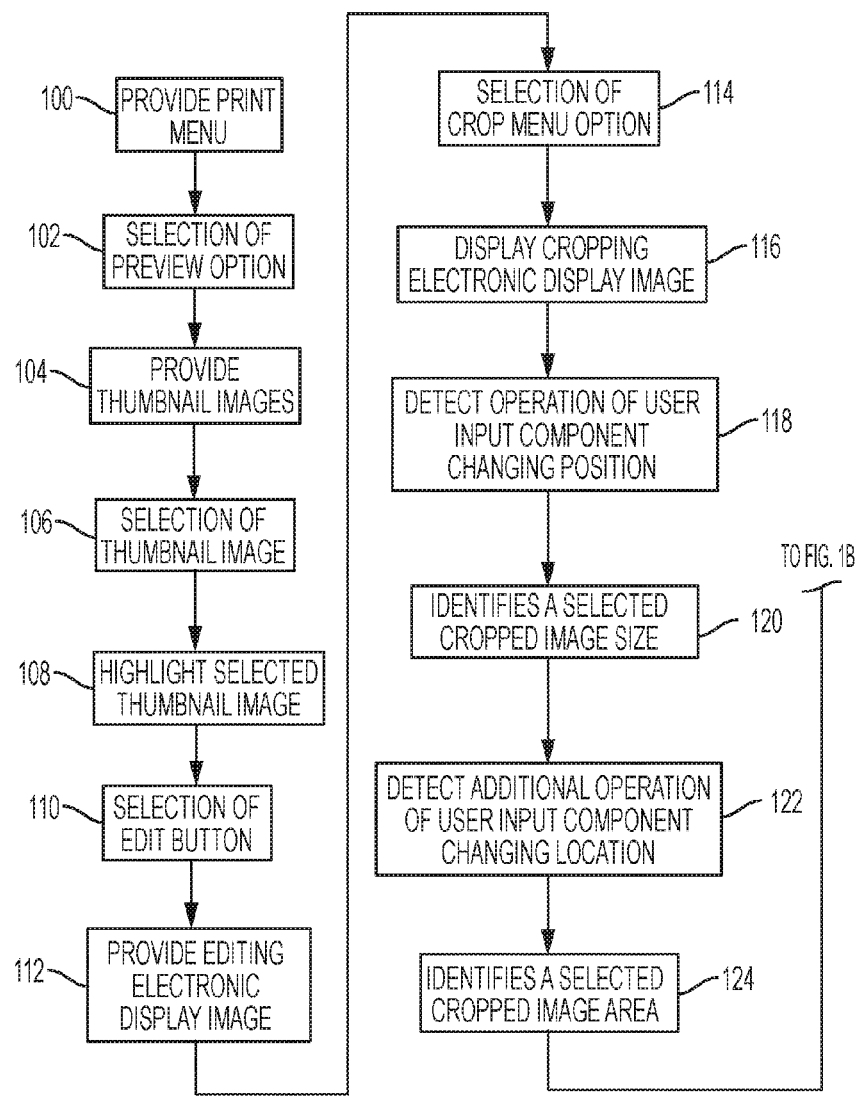
FIG. 1A-B is a flow diagram of various methods herein.
Figure 1B:
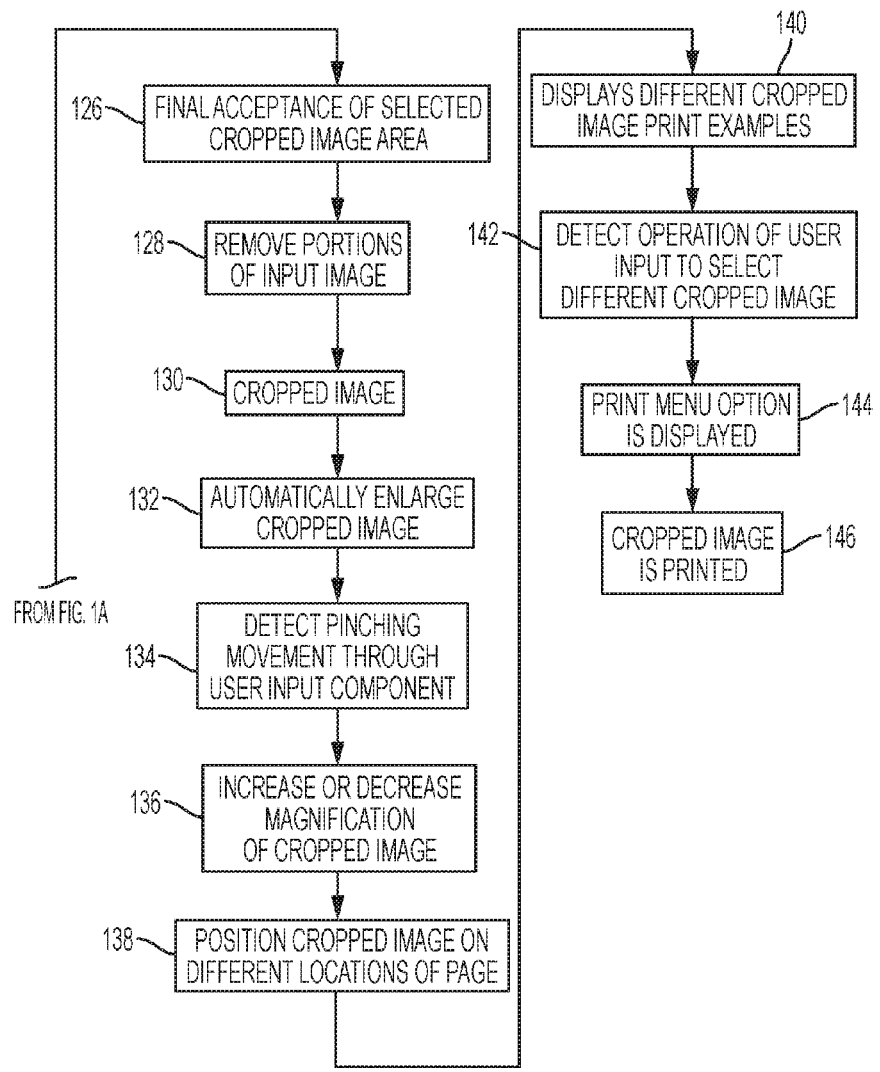

FIG. 1 is flowchart illustrating exemplary methods herein and is explained in reference to FIGS. 2-14, in the following discussion. These methods provide (from a processor 216, 224 to a display device 212, shown in FIG. 2) a "print-menu" electronic display image 350 related to printing a document, and the display device 212 displays the same, as shown in item 100 in FIG. 1. The display device 212 can be a component of, or connected to, a printer, copier, multi-function device, computer, portable electronic device, etc.; and the document can be an input image, a printable document generated by a software application, a printable item retrieved from storage, etc., and generally has document pages in an original page order.

Figure 2:
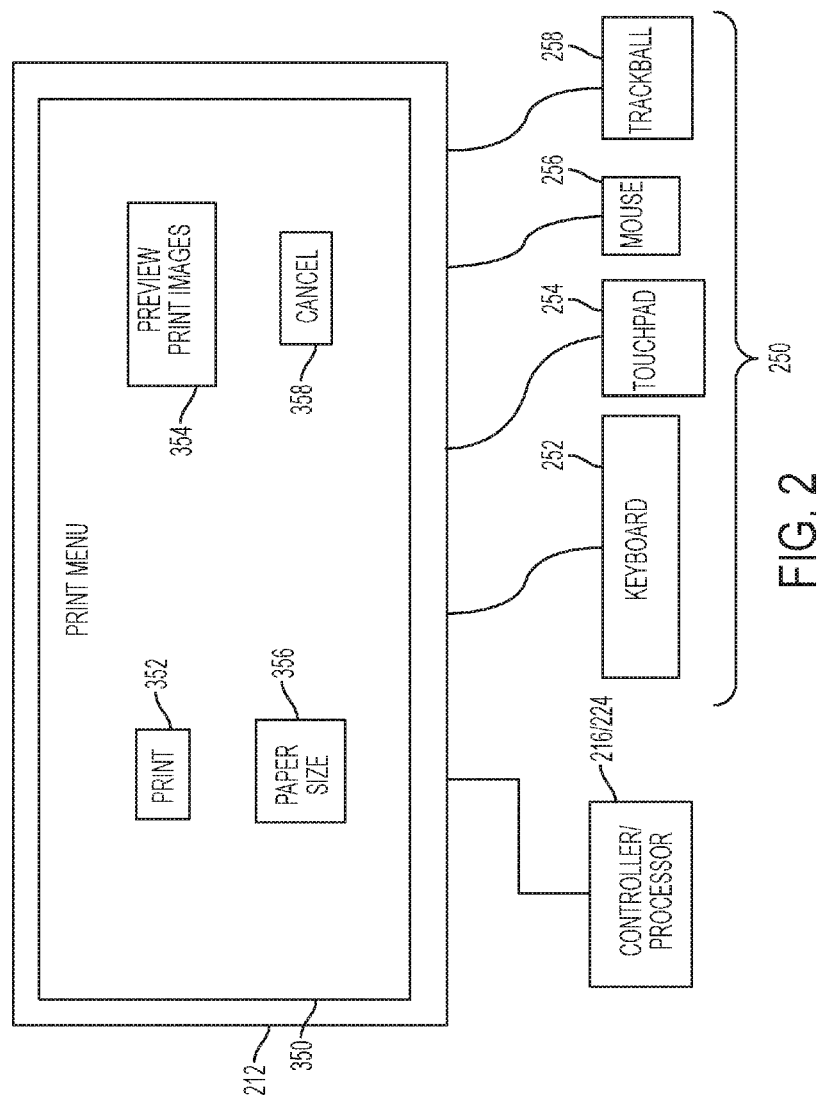
FIG. 2-14 are schematic diagrams illustrating displays herein.

As shown in FIG. 2, the display device 212 includes one or more items that make up a user input component 250 (non-limiting examples of which include, touch screen 212, keyboard 252, touchpad 254, mouse 256, trackball 258, etc., or any similar device) interacting with electronic screens (e.g., 320, 350, shown in FIGS. 2-15) displayed on the display device 212. The print-menu electronic display image 350 can include various menu options including (but not limited to) a "print" menu option 352, a "preview" menu option 354, a "paper size" menu option 356, a "cancel" menu option 358, etc. User selection of the preview menu option 354 (through user input to the user input component 250) is shown as item 102 in FIG. 1.

Figure 3:
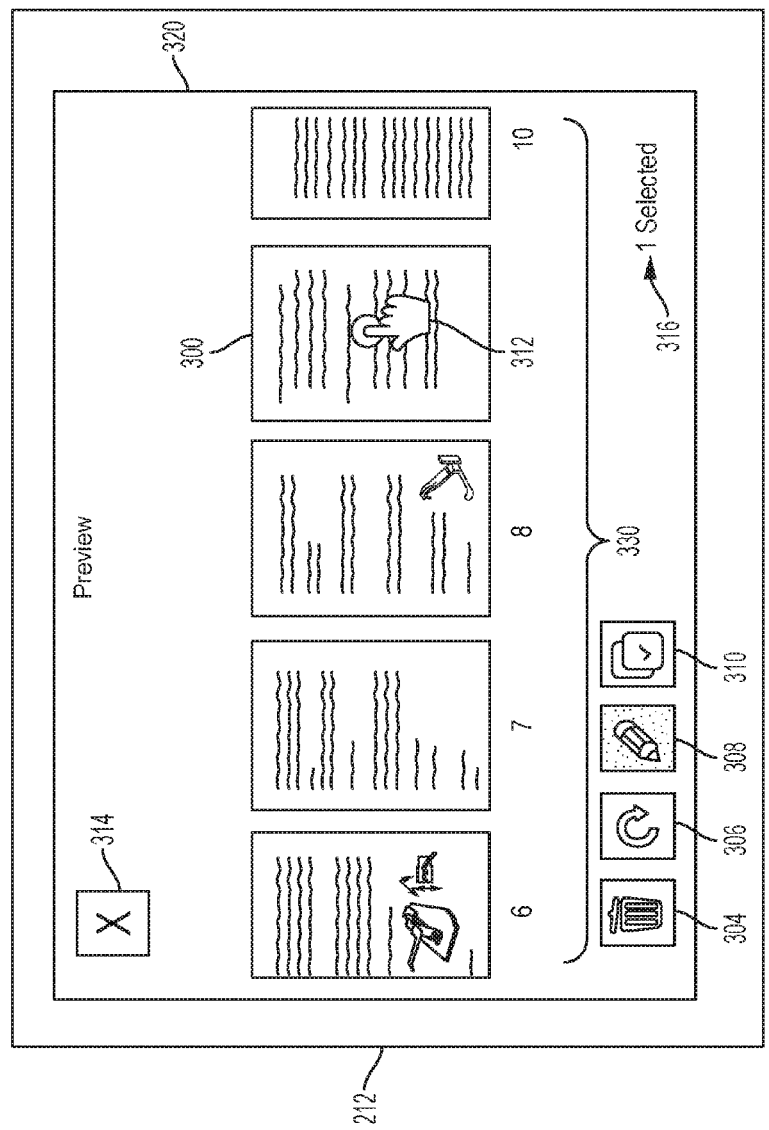

The methods herein provide (from the processor 216, 224 to the display device 212) a "thumbnail" electronic display image in item 104 in FIG. 1, in response to selection of the preview menu option 354 in item 102. As shown in FIG. 3, the thumbnail electronic display image 320 displays a linear strip of thumbnail images 330 of the document pages sequentially adjacent one another (potentially numbered, as shown) along a dimension (e.g., parallel to the linear bottom or side) of the display device 212.

In item 106, such methods detect operation of the user input component 250 selecting one of the thumbnail images within the movable thumbnail electronic display image 320 (to identify a selected thumbnail images 300). Illustration element 312 shows the operation of the user input component 250 as an aid to understanding how the methods and systems herein operate, and is not necessarily an element that appears within the thumbnail electronic display image 320 (especially if the user input component 250 is a touch screen display 212). For example, illustration element 312 shows that the user can tap, click, point, etc., using any user input 250 to select one of the thumbnail images 300. Thumbnail images can be similarly deselected by tapping, clicking, pointing, etc., a previously selected thumbnail image 300 a second time (e.g., re-selecting a previously selected thumbnail image an additional time). Display element 316 states the number of thumbnail images that are currently selected, and is updated each time a thumbnail image is selected or deselected.

These methods can also visually highlight the selected thumbnail image 300 within the movable thumbnail electronic display image 320, relative to unselected thumbnail images of the document pages, in response to the user selecting one or more of the thumbnail images, as shown in item 108. The highlighting process in item 108 changes appearance of the selected thumbnail image 300. For example, as shown in item 300, such highlighting changes (relative to the other unselected thumbnails) the brightness of the selected thumbnail image 300 (or "grays out" the unselected images by reducing their brightness), the color of the selected thumbnail image 300, a characteristic (color, brightness, etc.) of the background of the selected thumbnail image 300, a characteristic (color, brightness, etc.) of the outline (e.g., the border, the edge, etc.) of the selected thumbnail image 300, etc. Deselecting a thumbnail image removes any such highlighting in item 108.

FIG. 3 illustrates various other buttons, such as delete 304, rotate 306, edit 308, select all 310, cancel 314, etc., buttons that are displayed within the thumbnail electronic display image 320. Such buttons can be constantly displayed, or can appear or change from reduced brightness (change from "grayed out") to full brightness, in response to selection of one or more of the thumbnail images. For example, selection of the delete button 304 deletes the selected thumbnail image 300 from the linear strip of unselected thumbnail images, selection of the rotate button 306 rotates the selected thumbnail image 300 within the linear strip of thumbnail images, selection of the edit button 308 presents the selected thumbnail image 300 in an edit screen (shown in FIG. 4-14, discussed below), selection of the select all button 310 selects all the thumbnail images 300 within the linear strip of thumbnail images 330, selection of the cancel button 314 returns the view to the print-menu electronic display image 350 shown in FIG. 2, etc.

Figure 4:
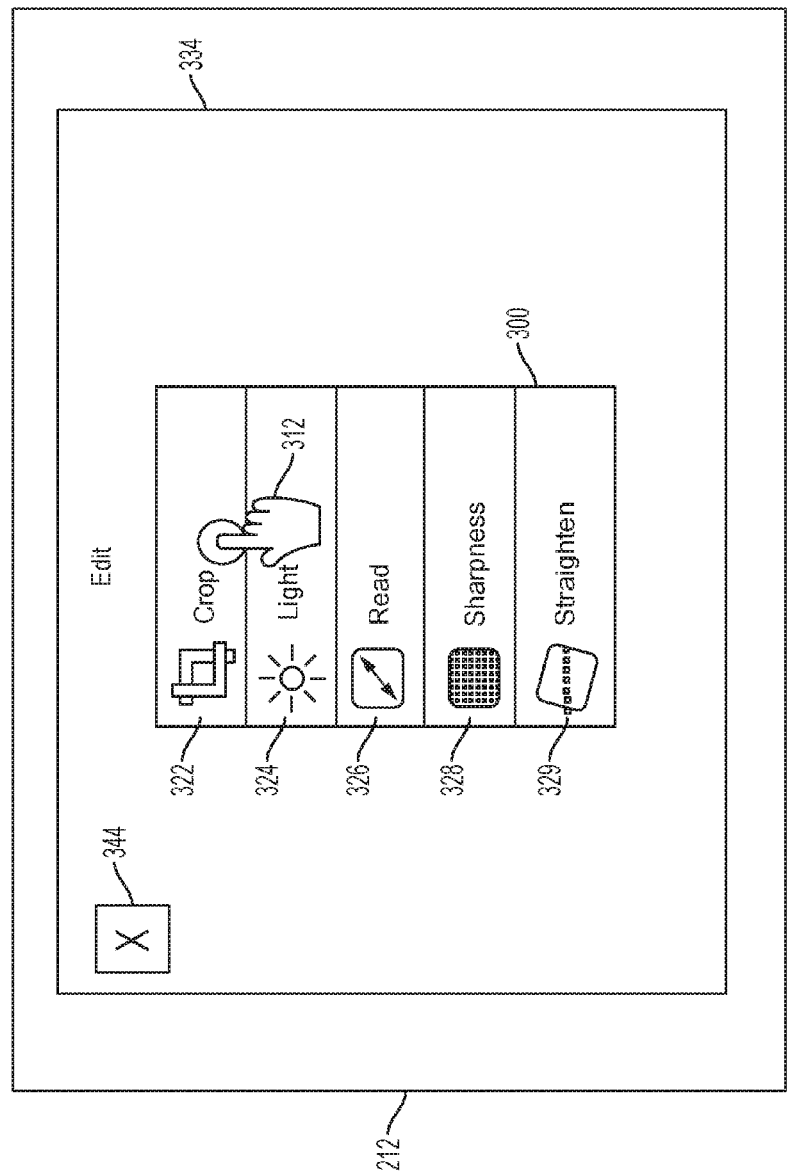

Item 110 in FIG. 1 shows selection of the edit button 308 (in FIG. 3). In response to selection of the edit button 308, in item 112 (through the user input component 250) these methods provide, from the processor 216, 224 to the display device 212, an editing electronic display image 334, shown in FIG. 4. As shown in FIG. 4, the editing electronic display image 334 includes a cancel button 344, a crop menu option 322, a lightness menu option 324, a read menu option 326, a sharpness menu option 328, and a straighten menu option 329.

Item 114 in FIG. 1 shows selection of the crop menu option, and this is shown by illustration element 312 selecting the crop menu option 322 in FIG. 4. In response to selection of the crop menu option 322, in item 116 (through the user input component 250) these methods provide, from the processor 216, 224 to the display device 212, a cropping electronic display image 340, shown in FIG. 5. The cropping electronic display image 340 in FIG. 5 includes a geometric shape 350 (e.g., rectangle, a triangle, a circle, etc.) superimposed on the input image 346, an accept menu option 348, a cancel menu option 344, etc.

Figure 5:
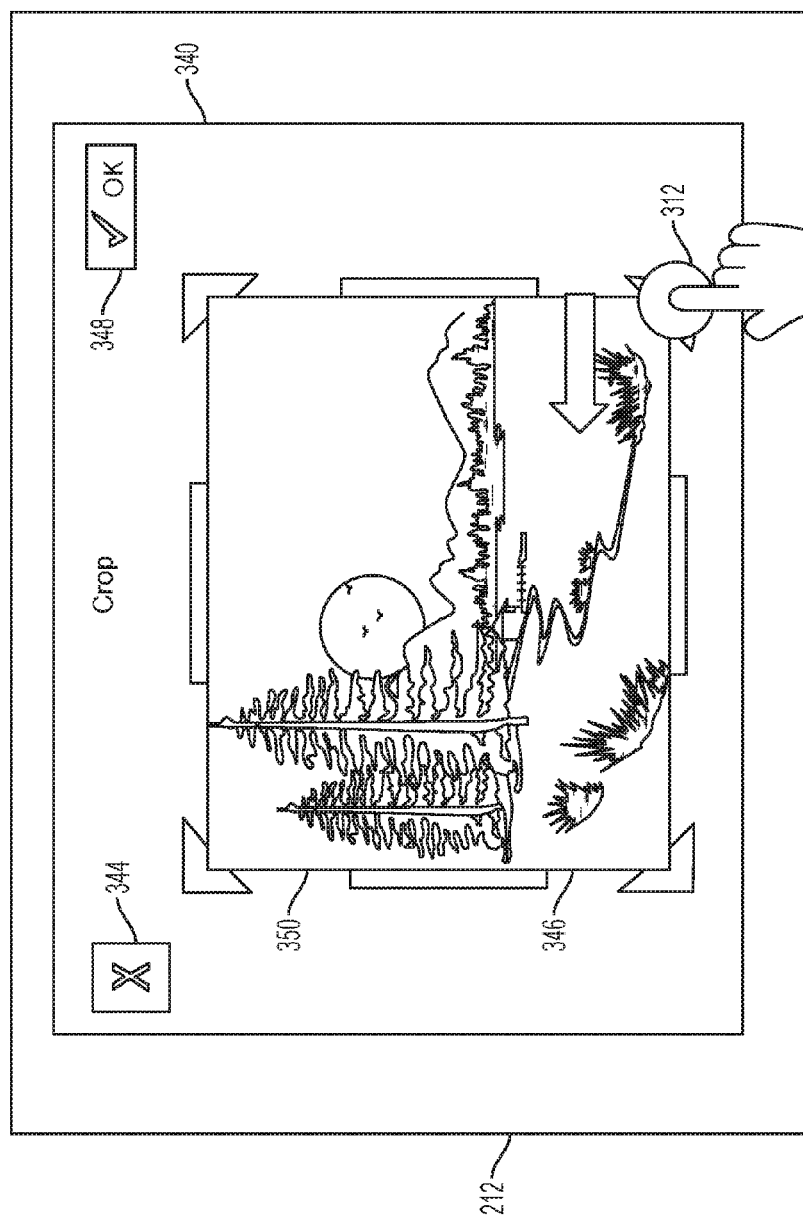
Figure 6:
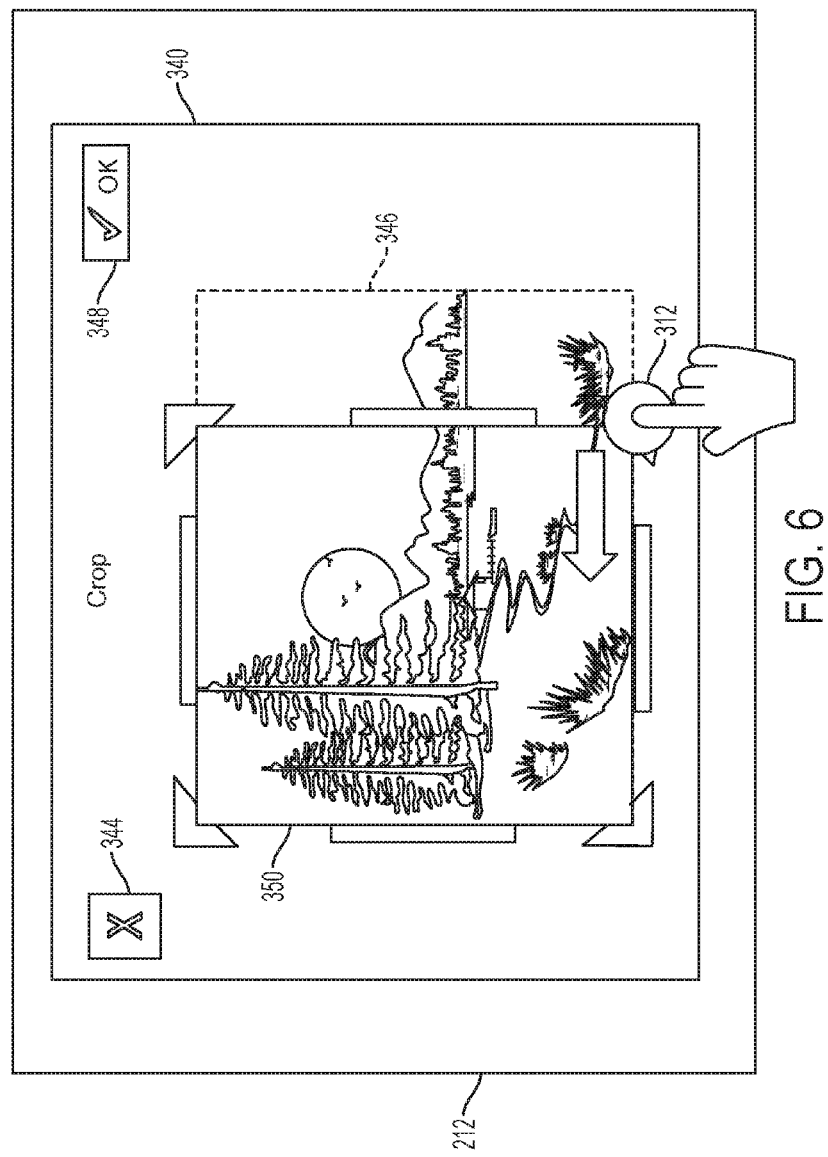
Figure 7:
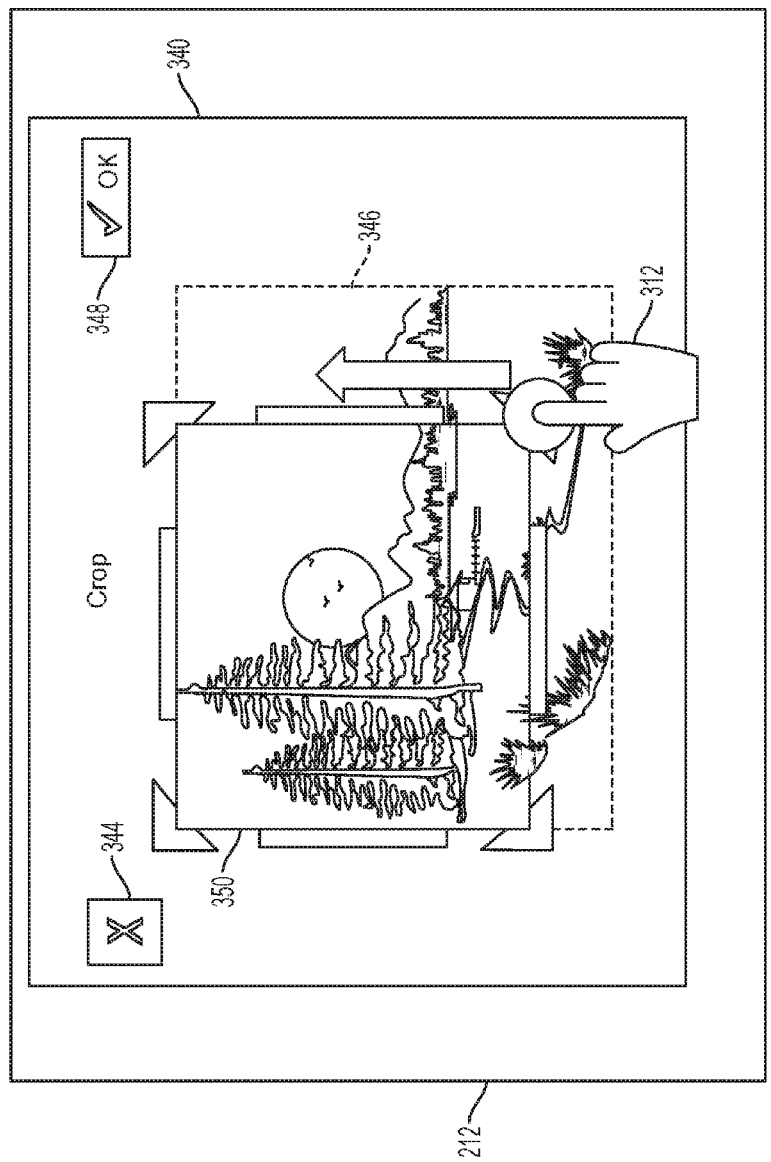

With the geometric shape 350 superimposed on the input image 346 in the cropping electronic display image 340, in item 118 these methods detect operation of the user input component 250 changing position (shown by block arrow in FIGS. 5-7) of at least one side of the geometric shape 350 within the cropping electronic display image 340 (e.g., through touch screen click-and-drag operations 312). Therefore, as shown in FIG. 5, the user "clicks" on one of the corners or edges of the geometric shape 350 by pushing and holding a button on a keyboard, mouse, etc., or placing and holding down their finger on a touchscreen, touchpad, etc (shown using illustration element 312). Then, while holding down the button or finger touch (in a "drag" operation), the user moves the corner of the geometric shape 350 to the left (shown by block arrows in FIGS. 5 and 6) and then upward (shown buy block arrow in FIG. 7), shown using illustration element 312. After these movements, the user releases the button or their finger to leave the reduced size geometric shape 350 shown in FIG. 7, which then has a size that is sometimes referred to herein as a selected cropped image size. As shown in item 120 in FIG. 1, this processing thereby identifies the selected cropped image size.

Figure 8:
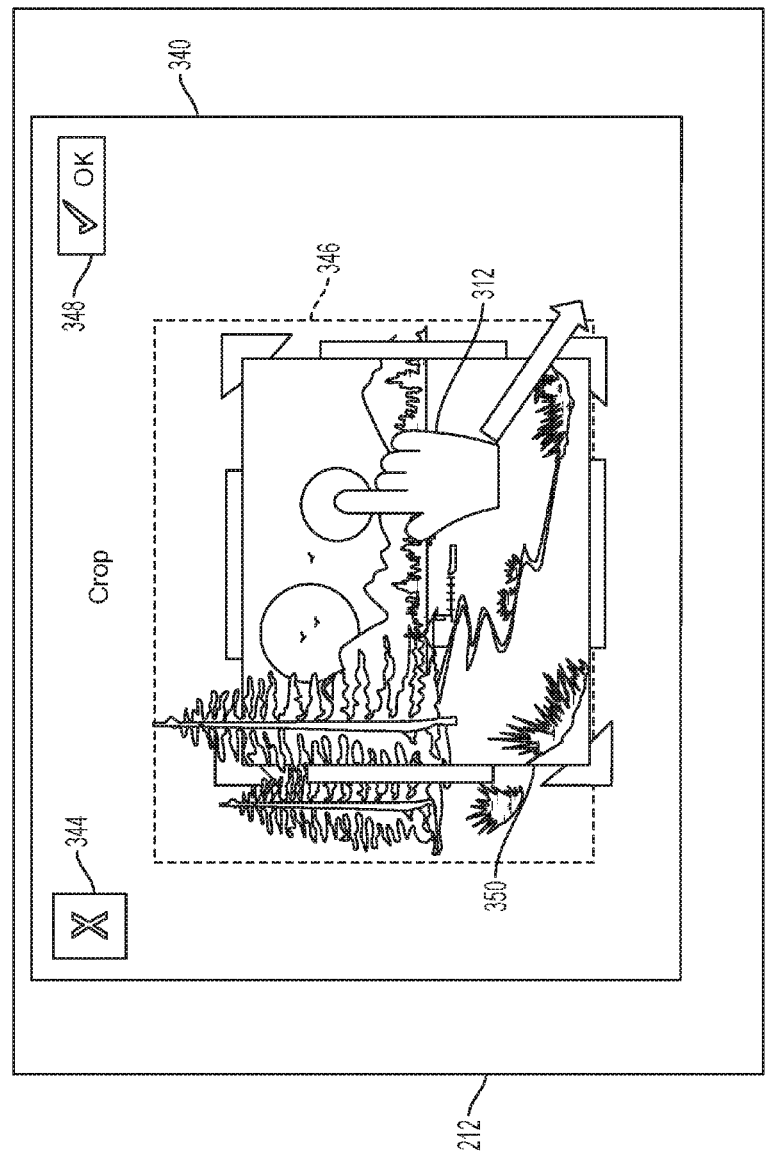

Further, in item 122 such methods can detect additional operation of the user input component 250 changing location of the geometric shape 350 within the cropping electronic display image 340. This is shown by block arrow in FIG. 8, where the user performs another click-and-drag operation to move the reduced size geometric shape 350 down into the right (shown using illustration element 312). This effectively changes the portion of the input image 346 that is within the reduced size geometric shape 350. As shown in FIG. 8, the geometric shape 350 maintains its selected cropped image size as it is moved in item 122, and such movement only changes the position of the geometric shape 350 within the cropping electronic display image 340, and this does not change the size of the geometric shape 350. As shown in item 124 in FIG. 1, this processing identifies a "selected" cropped image area 374, shown in FIG. 9.

Figure 9:
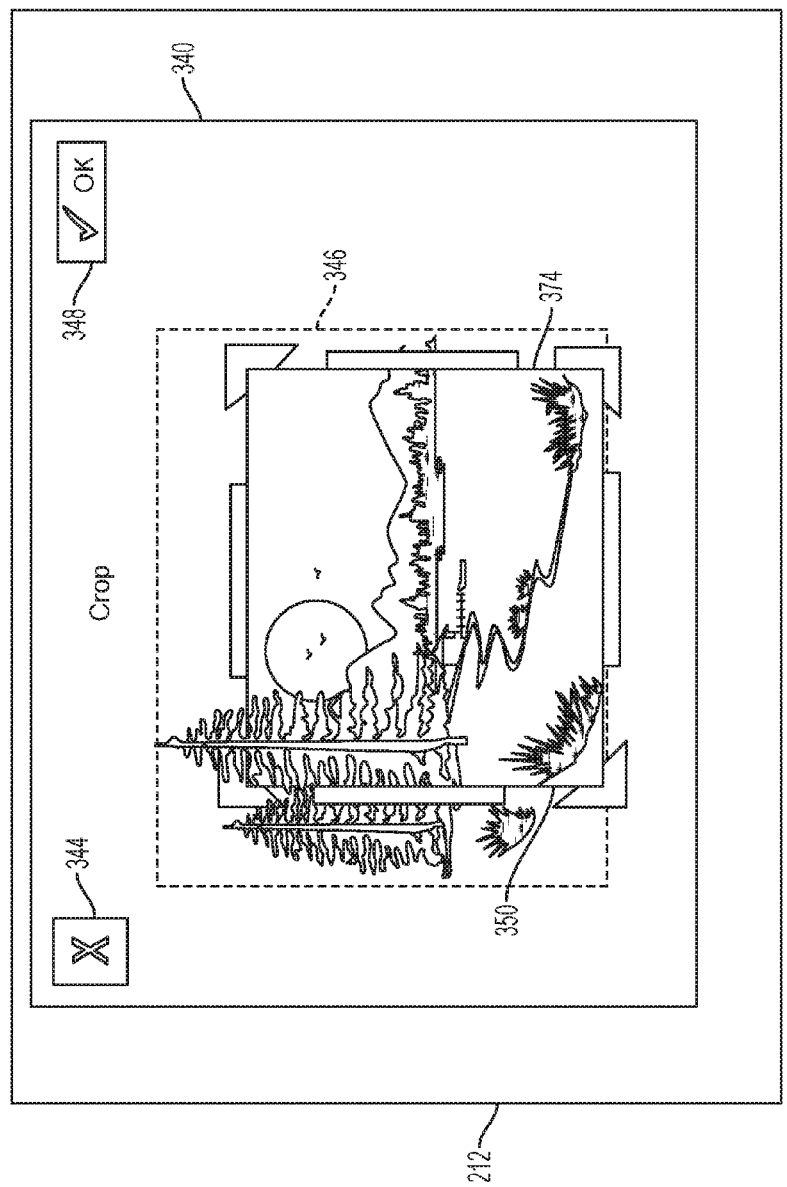
Figure 10:
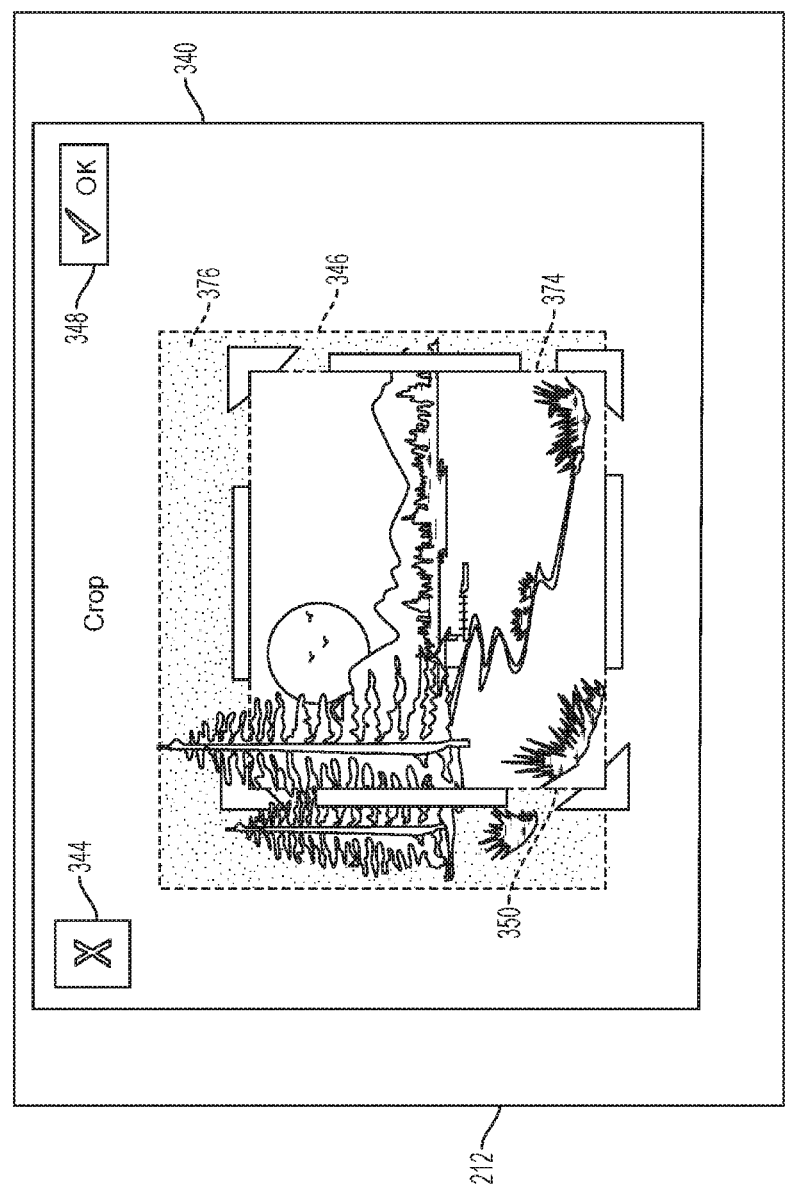

Once the cropped image area 374 has been identified in item 124, these methods detect further operation of the user input component 250 completing the process of changing location of the geometric shape 350 (e.g., by releasing the user interface screen or button) or, for example, selecting the accept menu option 348, as shown in item 126 in FIG. 1, and this indicates final acceptance of the selected cropped image area 374, shown in FIG. 9. Also, the selected cropped image area 374 of the input image 346 can be displayed relatively brighter than the portions 376 of the input image outside the selected cropped image area 374 on the display device 212, as shown in FIG. 10.

Figure 11:
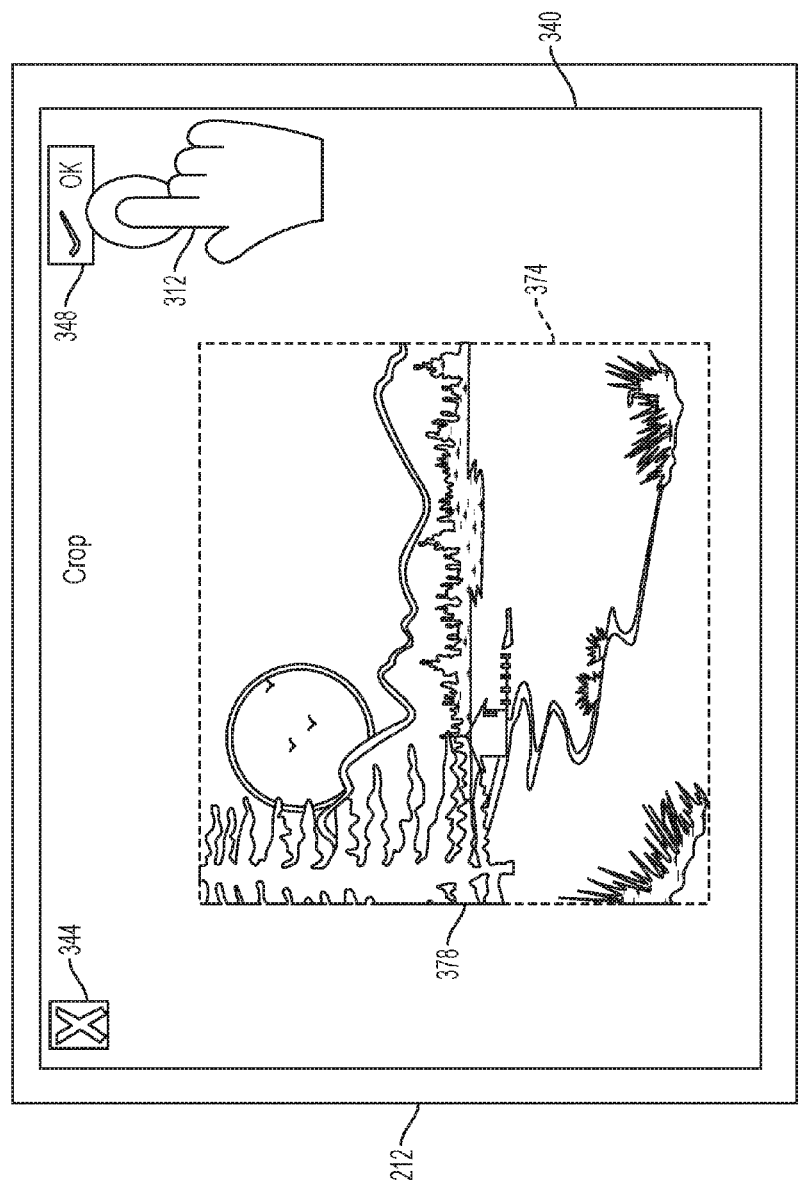

After the final acceptance of the selected cropped image area 374 in item 126, these methods remove portions of the input image that are outside the selected cropped image area 374 in item 128 in FIG. 1. The processing in item 128 is performed automatically in response to the final acceptance of the selected cropped image area 374 in item 126, using the processor 216, 224, as shown in FIG. 11. As shown in item 130 in FIG. 1, this produces a cropped image 378, shown in FIG. 11.

Figure 12:
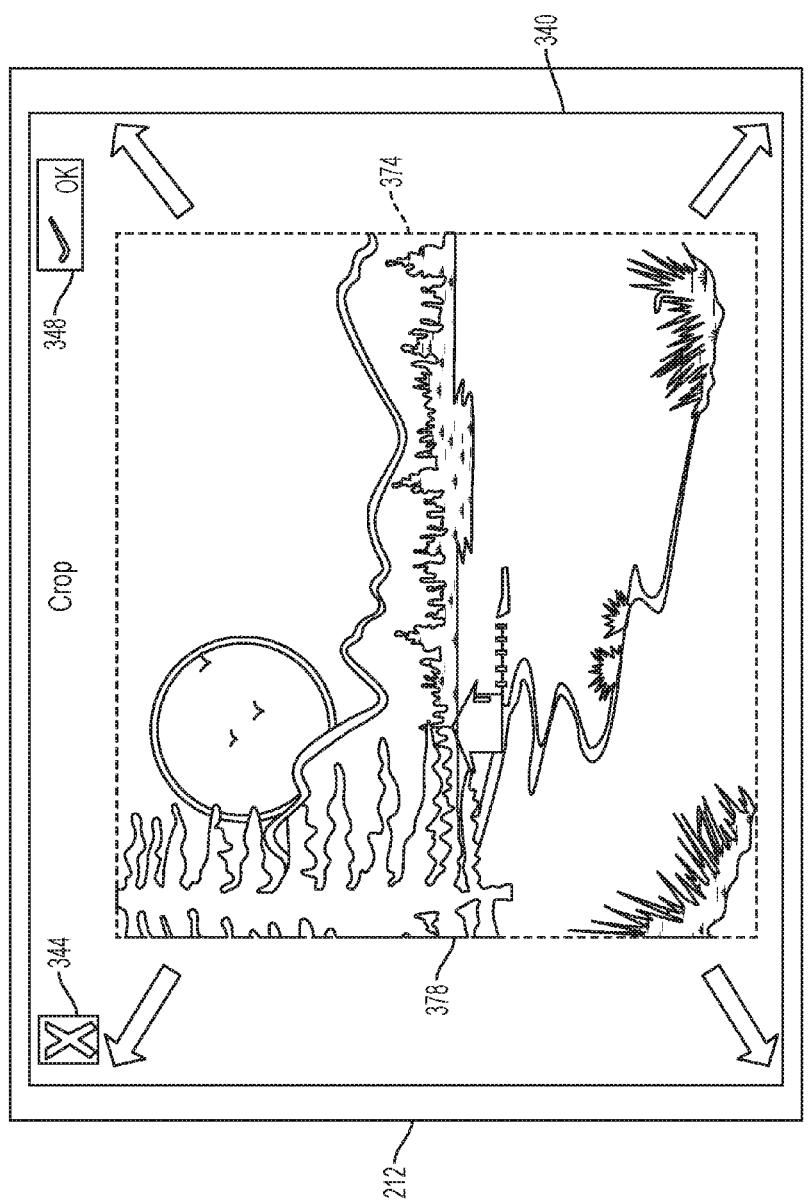
Figure 13:
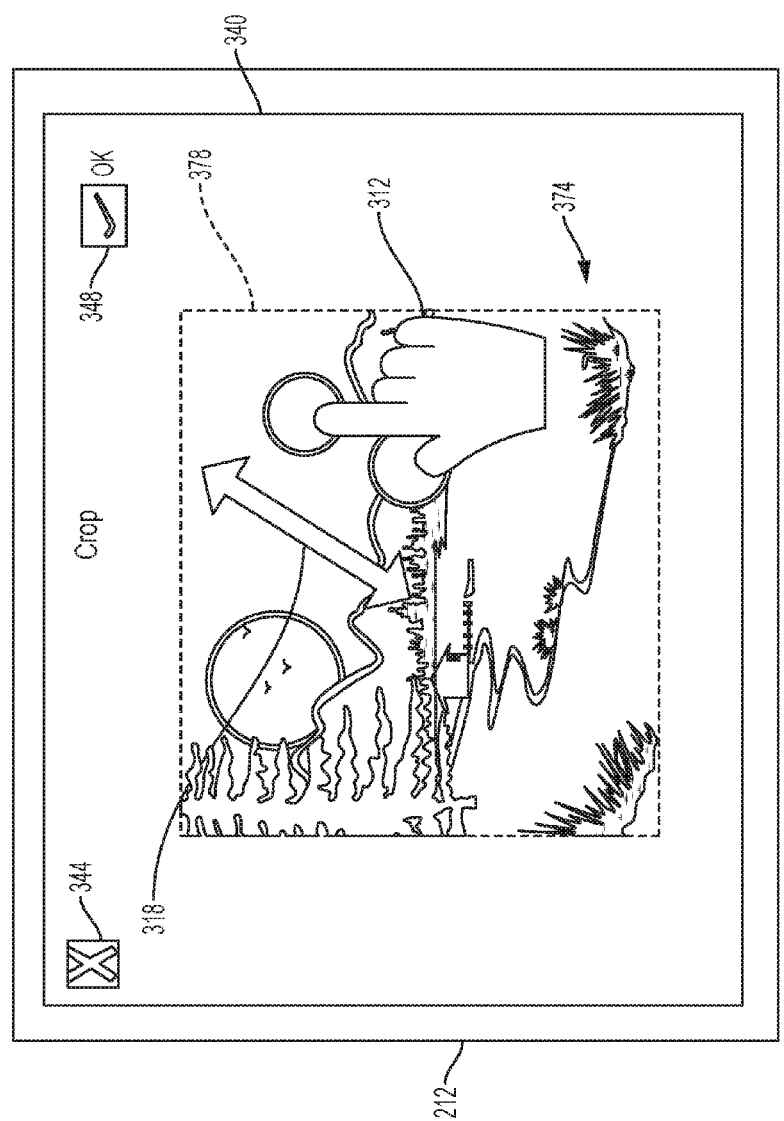
Figure 14:
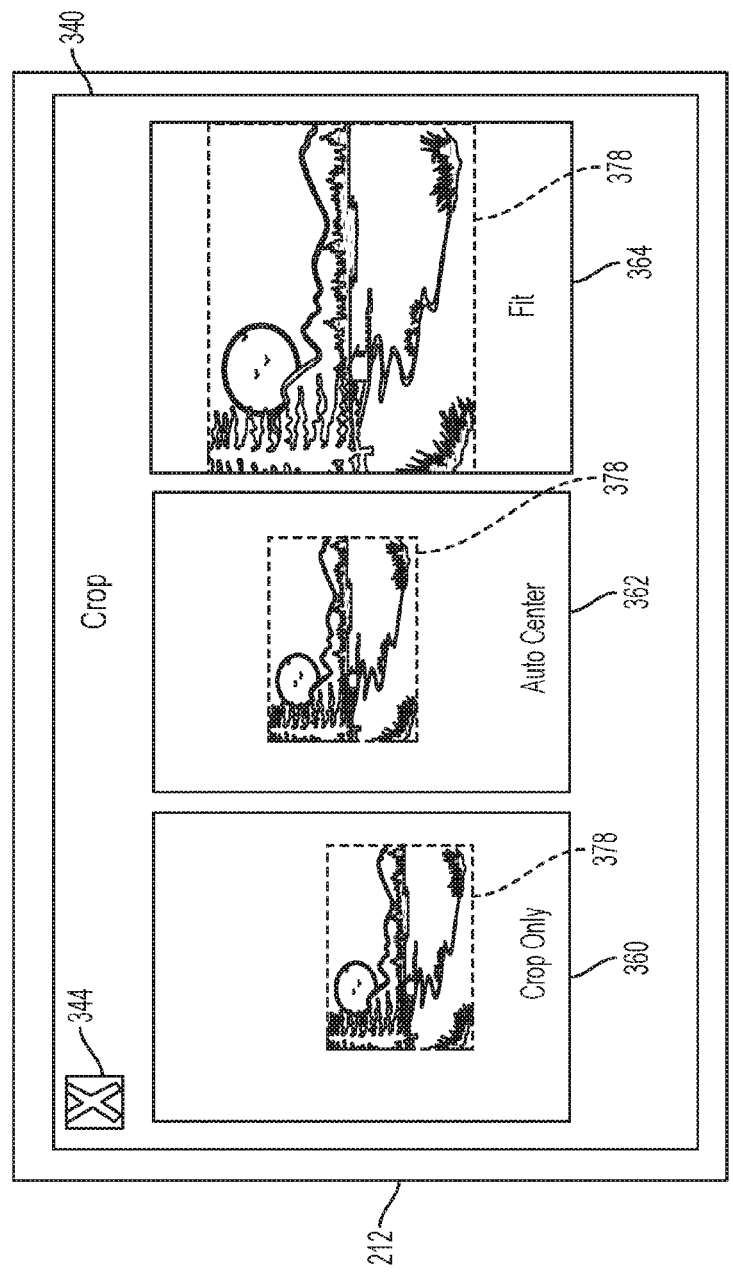

Next, in item 132 in FIG. 1, the processor 216, 224 automatically enlarges the cropped image 378 and cropped image area 374 to best fit within the cropping electronic display image 340, using the processor 216, 224; and this is shown by block arrow in FIG. 12. The enlargement in item 132 allows the cropped image 378 to be most easily viewed on the display device 212. For example, to best fit the cropped image 378 and cropped image area 374 within the cropping electronic display image in item 132, the cropped image 378 and cropped image area 374 can be increased automatically by the processor to occupy a percentage (e.g., 60%, 75%, 90%, etc.) of the center of the cropping electronic display image 340.

Once the cropped image 378 is enlarged in item 132, these methods also detect a pinching movement through the user input component 250 in item 134 in FIG. 1. This pinching movement 318 is shown through illustration feature 312, in FIG. 13 as the user making contact at two different points on a touchscreen or touchpad with two fingers, and then moving the fingers toward or away from one another. In response to the pinching movement in item 134, as shown in item 136 in FIG. 1, the processor 216, 224 increases or decreases magnification of the cropped image 378, without changing the size of the cropped image area 374 within the cropping electronic display image 340. This increase or decrease in magnification as shown using block arrows (item 318) in FIG. 13.

Additional, as shown in item 138 in FIG. 1, these methods can position the cropped image 378 on different locations of an electronic printable page to produce different cropped image print examples 360, 362, 364 (shown in FIG. 16) using the processor 216, 224. The different locations of the electronic printable page can include, for example, the cropped image 378 having the selected cropped image size on the electronic printable page in a position corresponding to the selected cropped image area 374, as shown using item 360, the selected cropped image 378 centered on the electronic printable page 362, the cropped image 378 expanded larger than the selected cropped image size to reach at least two sides of the electronic printable page 364, etc.

Thus, the processor 216, 224 provides, to the display device 212, the different cropped image print examples in item 140 in FIG. 1. Further, these methods detect operation of the user input component 250 selecting one of the different cropped image print examples to identify a selected cropped image print in item 142 in FIG. 1. A print menu option (352, FIG. 2) is displayed on the display device 212 in item 144 in FIG. 1, and the cropped image 378 is printed in response to selection of the print menu option 352, as shown in item 146 in FIG. 1.

Figure 15:
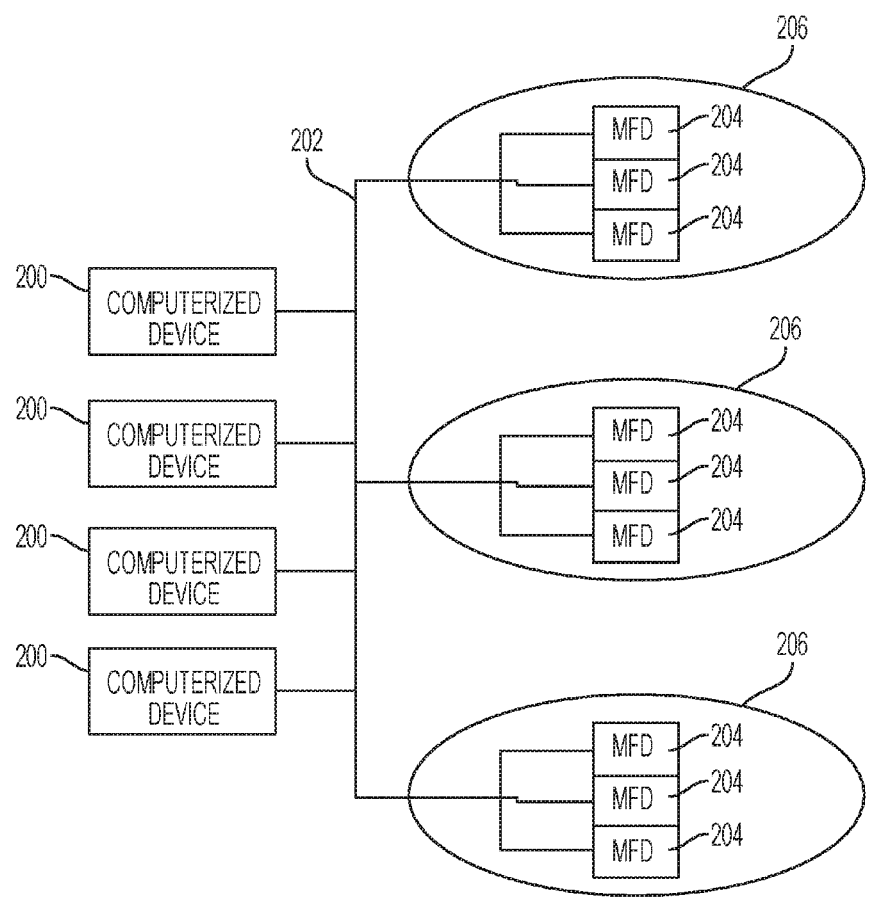
FIG. 15 is a schematic diagram illustrating systems herein.

As shown in FIG. 15, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 16:
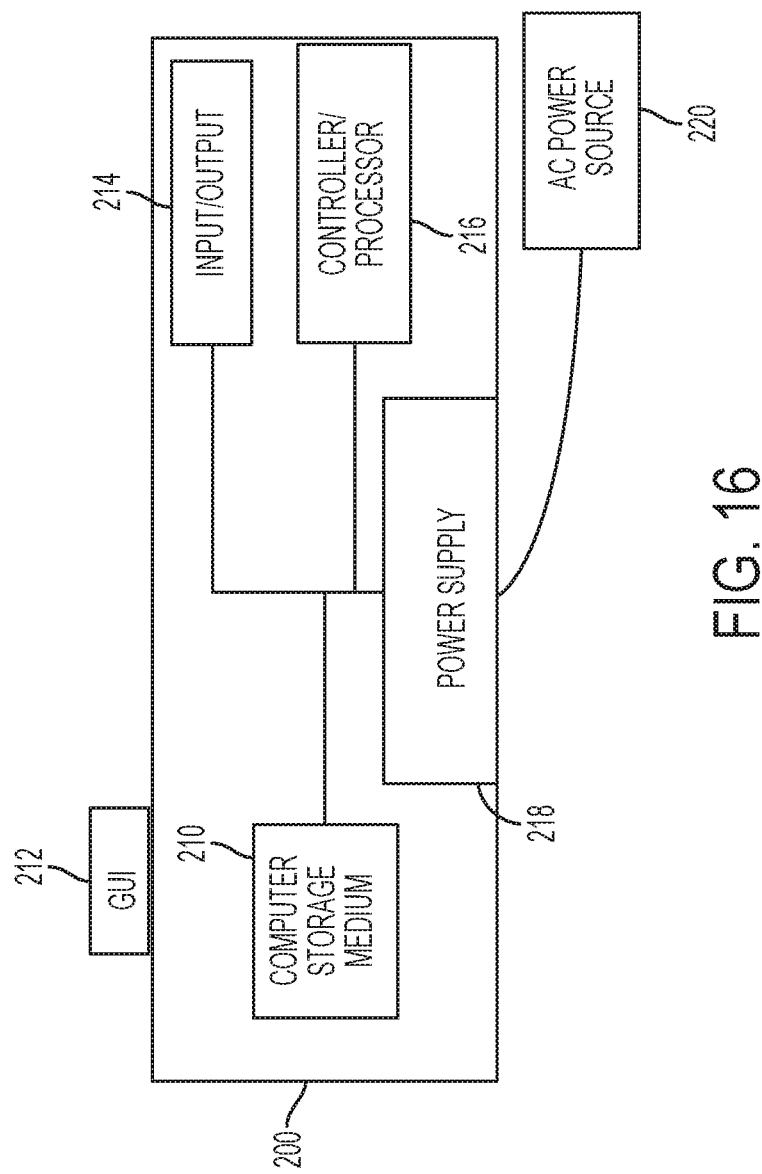
FIGS. 16-17 are schematic diagrams illustrating devices herein.

FIG. 16 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 16, a body housing has one or more functional components that operate on power supplied from an alternating current (AC) source 220 by the power supply 218. The power supply 218 can comprise a common power conversion unit, power storage element (e.g., a battery, etc), etc.

Figure 17:
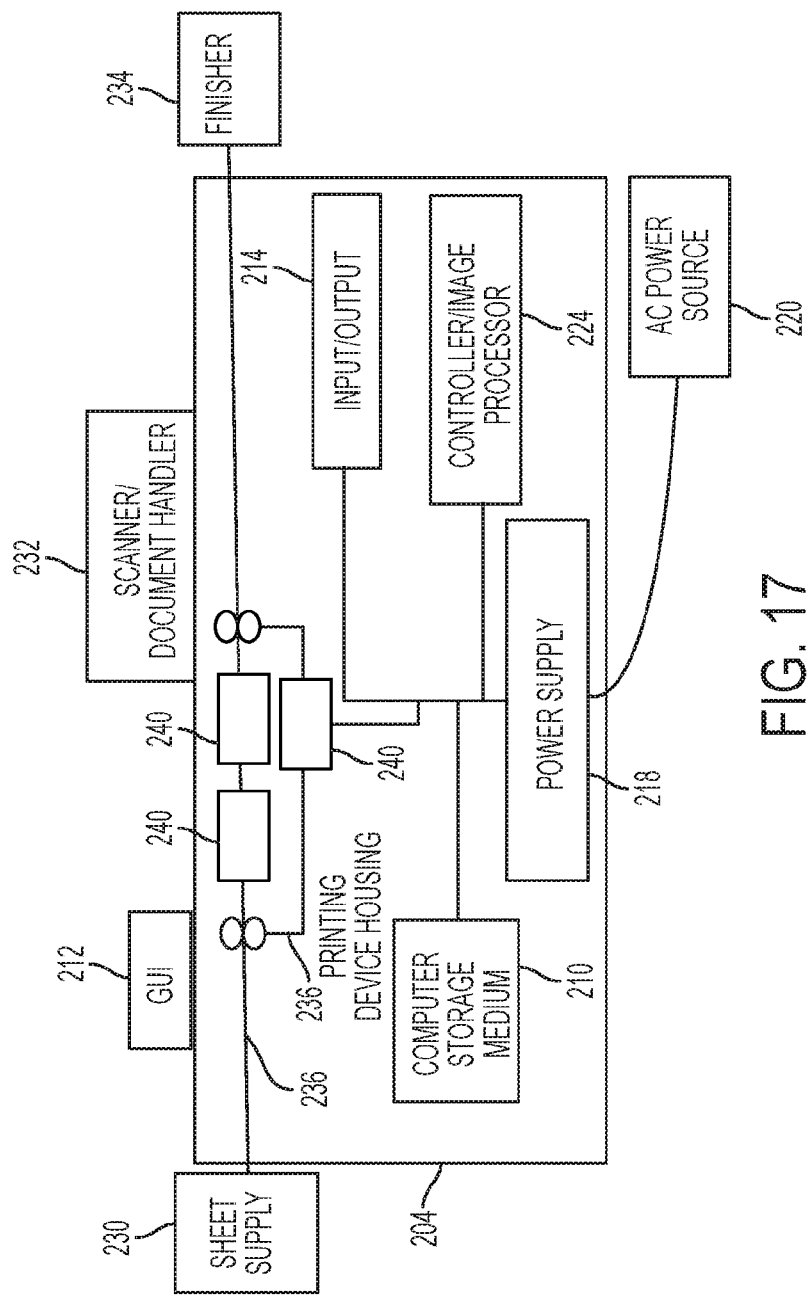

FIG. 17 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printing device 204 shown in FIG. 17 is only one example and the systems and methods herein are equally applicable to other types of printing devices that may include fewer components or more components. For example, while a limited number of printing engines and paper paths are illustrated in FIG. 17, those ordinarily skilled in the art would understand that many more paper paths and additional printing engines could be included within any printing device used with systems and methods herein.

Thus, as shown above, an exemplary apparatus herein includes (among other components a processor 216, 224; and a scanner 232, display device 212, printer 204, etc., operatively connected to (meaning directly or indirectly connected to) the processor 216, 224. The display device 212 includes one or more user input component 250s interacting with screens displayed on the display device 212.

The processor 216, 224 receives an input image 346 from any location, such as from a scanner 232 that scans an item, an application that generates a printable item, printable items previously stored in memory, etc. The processor 216, 224 provides, to the display device 212, any form of image crop menu option. In response to selection of the input image 346 crop menu option through the user input component 250, the processor 216, 224 provides, to the display device 212, a cropping electronic display image 340. The cropping electronic display image 340 includes, for example, a geometric shape 350 (e.g., rectangle, triangle, circle, etc.) superimposed on the input image 346, an accept menu option 348, a cancel menu option, etc.

The display device 212 displays the cropping electronic display image 340, and the user input component 250 detects user input changing the position of at least one side of the geometric shape 350 within the cropping electronic display image 340 (e.g., using a click-and-drag operation) to identify a selected cropped image size. The user input component 250 also detects user input changing the location of the geometric shape 350 (having the selected cropped image size) within the cropping electronic display image 340, to identify a selected cropped image area 374. The user input component 250 detects the user completing the process of changing location of the geometric shape 350 (e.g., by releasing the user interface screen or button) or, for example, selecting the accept menu option 348, to indicate final acceptance of the selected cropped image area 374. For example, the display device 212 can display the selected cropped image area 374 of the input image 346 relatively brighter than the portions of the input image 346 outside the selected cropped image area 374.

In response to final acceptance of the selected cropped image area 374, the processor 216, 224 automatically removes portions of the input image 346 that are outside the selected cropped image area 374 to produce a cropped image 378. The processor 216, 224 enlarges the cropped image 378 to best fit within the cropping electronic display image 340. Once the cropped image 378 is enlarged, these methods can also detect a pinching movement through the user input component 250. In response to this pinching movement, the processor 216, 224 increases or decreases magnification of the cropped image 378, without changing the size of the cropped image area within the cropping electronic display image 340.

Additional, the processor 216, 224 can position the cropped image 378 on different locations of an electronic printable page to produce different cropped image print examples, the processor 216, 224 provides the same to the display device 212, which are in turn displayed by the display device 212. The different locations of the electronic printable page can include, for example, the selected cropped image size centered on the electronic printable page, the cropped image 378 expanded larger than the selected cropped image size to reach at least two sides of the electronic printable page, the cropped image 378 having the selected cropped image size on the electronic printable page in a position corresponding to the selected cropped image area 374, etc. The user input component 250 detects the user selecting one of the different cropped image print examples, and this identifies a selected cropped image print. Then, the display device 212 displays a print menu option, and the printer 204 prints the selected cropped image print in response to selection of the print menu option.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving, into a processor, an input image;
   providing, from said processor to a display device, an image crop menu option, said display device includes a user input component interacting with screens displayed on said display device;
   providing, from said processor to said display device, a cropping electronic display image, in response to selection of said image crop menu option through said user input component, said cropping electronic display image includes a geometric shape superimposed on said input image;
   detecting operation of said user input component changing position of at least one side of said geometric shape within said cropping electronic display image, to identify a selected cropped image area;
   removing portions of said input image outside said selected cropped image area to produce a cropped image in response to completing said changing position of at least one side of said geometric shape, using said processor;

enlarging said cropped image and said selected cropped image area to fit within said cropping electronic display image, using said processor;

positioning said cropped image on different locations of an electronic printable page to produce different cropped image print examples, using said processor;

providing, from said processor to said display device, said different cropped image print examples;

detecting operation of said user input component selecting one of said different cropped image print examples to identify a selected cropped image print;

displaying a print menu option on said display device; and printing said selected cropped image print in response to selection of said print menu option.

2. The method according to claim 1, further comprising detecting a pinching movement through said user input component after said enlarging said cropped image, said pinching movement increases or decreases magnification of said cropped image, without changing the size of said cropped image are within said cropping electronic display image.

3. The method according to claim 1, said different locations of said electronic printable page comprise:
    said cropped image having a selected cropped image size centered on said electronic printable page;
    said cropped image expanded larger than said selected cropped image size to reach at least two sides of said electronic printable page; and
    said cropped image having said selected cropped image size on said electronic printable page in a position corresponding to said selected cropped image area.

4. The method according to claim 1, said geometric shape comprising a rectangle, a triangle, or a circle.

5. The method according to claim 1, said operation of said user input component changing position of at least one side of said geometric shape, and said operation of said user input component changing location of said geometric shape comprise user interface click-and-drag operations.

6. The method according to claim 1, further comprising displaying said selected cropped image area of said input image relatively brighter than said portions of said input image outside said selected cropped image area on said display device.

7. The method according to claim 1, further comprising scanning said input image using a scanner.

8. A method comprising:
    receiving, into a processor, an input image from a scanner;
    providing, from said processor to a display device, an input image crop menu option, said display device includes a user input component interacting with screens displayed on said display device;
    providing, from said processor to said display device, a cropping electronic display image, in response to selection of said input image crop menu option through said user input component, said cropping electronic display image includes a geometric shape superimposed on said input image;
    detecting operation of said user input component changing position of at least one side of said geometric shape within said cropping electronic display image, to identify a selected cropped image size;
    detecting operation of said user input component changing location of said geometric shape within said cropping electronic display image, to identify a selected cropped image area;
    removing portions of said input image outside said selected cropped image area to produce a cropped image in response to completing said changing location of said geometric shape, using said processor enlarging said cropped image and said selected cropped image area to fit within said cropping electronic display image, using said processor;
    positioning said cropped image on different locations of an electronic printable page to produce different cropped image print examples, using said processor;
    providing, from said processor to said display device, said different cropped image print examples;
    detecting operation of said user input component selecting one of said different cropped image print examples to identify a selected cropped image print;
    displaying a print menu option on said display device; and
    printing said selected cropped image print in response to selection of said print menu option.

9. The method according to claim 8, further comprising detecting a pinching movement through said user input component after said enlarging said cropped image, said pinching movement increases or decreases magnification of said cropped image, without changing the size of said cropped image are within said cropping electronic display image.

10. The method according to claim 8, said different locations of said electronic printable page comprise:
    said cropped image having said selected cropped image size centered on said electronic printable page;
    said cropped image expanded larger than said selected cropped image size to reach at least two sides of said electronic printable page; and
    said cropped image having said selected cropped image size on said electronic printable page in a position corresponding to said selected cropped image area.

11. The method according to claim 8, said geometric shape comprising a rectangle, a triangle, or a circle.

12. The method according to claim 8, said operation of said user input component changing position of at least one side of said geometric shape, and said operation of said user input component changing location of said geometric shape comprise user interface click-and-drag operations.

13. The method according to claim 8, further comprising displaying said selected cropped image area of said input image relatively brighter than said portions of said input image outside said selected cropped image area on said display device.

14. The method according to claim 8, further comprising scanning said input image using said scanner.

15. A system comprising:
    a processor;
    a scanner operatively connected to said processor;
    a display device operatively connected to said processor, said display device includes a user input component interacting with screens displayed on said display device; and
    a printer operatively connected to said processor,
    said processor receives an input image from said scanner,
    said processor provides, to said display device, an input image crop menu option, said processor provides, to said display device, a cropping electronic display image, in response to selection of said input image crop menu option through said user input component, said cropping electronic display image includes:
a geometric shape superimposed on said input image;
an accept menu option; and
a cancel menu option,
said display device displays said cropping electronic display image,
said user input component detects changing position of at least one side of said geometric shape within said cropping electronic display image, to identify a selected cropped image size,
said user input component detects changing location of said geometric shape within said cropping electronic display image, to identify a selected cropped image area,
said user input component detects selecting said accept menu option to indicate final acceptance of said selected cropped image area,
said processor removes portions of said input image outside said selected cropped image area to produce a cropped image in response to said accept menu being selected,
said processor enlarges said cropped image and said selected cropped image area to fit within said cropping electronic display image,
said processor positions said cropped image on different locations of an electronic printable page to produce different cropped image print examples,
said processor provides, to said display device, said different cropped image print examples,
said display device displays said different cropped image print examples,
said user input component detects selecting one of said different cropped image print examples to identify a selected cropped image print,
said display device displays a print menu option, and
said printer prints said selected cropped image print in response to selection of said print menu option.

16. The system according to claim 15, said user input component detecting a pinching movement through said user input component after said enlarging said cropped image, said pinching movement increases or decreases magnification of said cropped image, without changing the size of said cropped image are within said cropping electronic display image.

17. The system according to claim 15, said different locations of said electronic printable page comprise:
said cropped image having said selected cropped image size centered on said electronic printable page;
said cropped image expanded larger than said selected cropped image size to reach at least two sides of said electronic printable page; and
said cropped image having said selected cropped image size on said electronic printable page in a position corresponding to said selected cropped image area.

18. The system according to claim 15, said geometric shape comprising a rectangle, a triangle, or a circle.

19. The system according to claim 15, said changing position of at least one side of said geometric shape, and said changing location of said geometric shape comprise user interface click-and-drag operations.

20. The system according to claim 15, said scanner scans said input image.

* * * * *